(12) United States Patent
Burdenko et al.

(10) Patent No.: US 6,301,438 B1
(45) Date of Patent: Oct. 9, 2001

(54) FILM ADVANCEMENT ASSEMBLY FOR A SELF-DEVELOPING CAMERA

(75) Inventors: Michael N. Burdenko, Wellesley; Juan C. VanDijk, Sudbury; Kenneth J. Launie, Cambridge, all of MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/661,236

(22) Filed: Sep. 13, 2000

(51) Int. Cl.[7] .................................................. G03B 17/50
(52) U.S. Cl. ............................ 396/30; 396/37; 396/348; 396/350
(58) Field of Search ............................... 396/30, 37, 348, 396/350, 34; 358/1.1; 347/152, 222

(56) References Cited

U.S. PATENT DOCUMENTS

| | | | |
|---|---|---|---|
| 3,753,392 | * 8/1973 | Land | 396/37 |
| 4,064,518 | * 12/1977 | Douglas | 396/34 |
| 4,109,259 | * 8/1978 | Tarr | 396/37 |
| 5,218,391 | * 6/1993 | Kanai | 396/34 |
| 5,687,411 | * 11/1997 | Matsuzaki et al. | 396/310 |
| 6,046,815 | * 4/2000 | Johnson | 358/1.1 |
| 6,055,374 | * 4/2000 | Douglas | 396/30 |

* cited by examiner

*Primary Examiner*—D. Rutledge
(74) *Attorney, Agent, or Firm*—Paul M. Coryea

(57) ABSTRACT

A film advancement assembly for a self-developing and folding camera. The camera comprising a main frame assembly and a lens assembly. The lens assembly being pivotally mounted on the main frame assembly and movable between a closed position in which the lens assembly is disposed at least in part within the main frame assembly and an open position in which the lens assembly upstands from the main frame assembly. A gear train is mounted on the main frame member and is operative to drive a pair of spread rolls, and operative to drive a film pick to advance a film unit. A motor is mounted on the main frame assembly and is operative to power the gear train, the motor being disposed proximate a bottom surface of the main frame assembly.

18 Claims, 8 Drawing Sheets

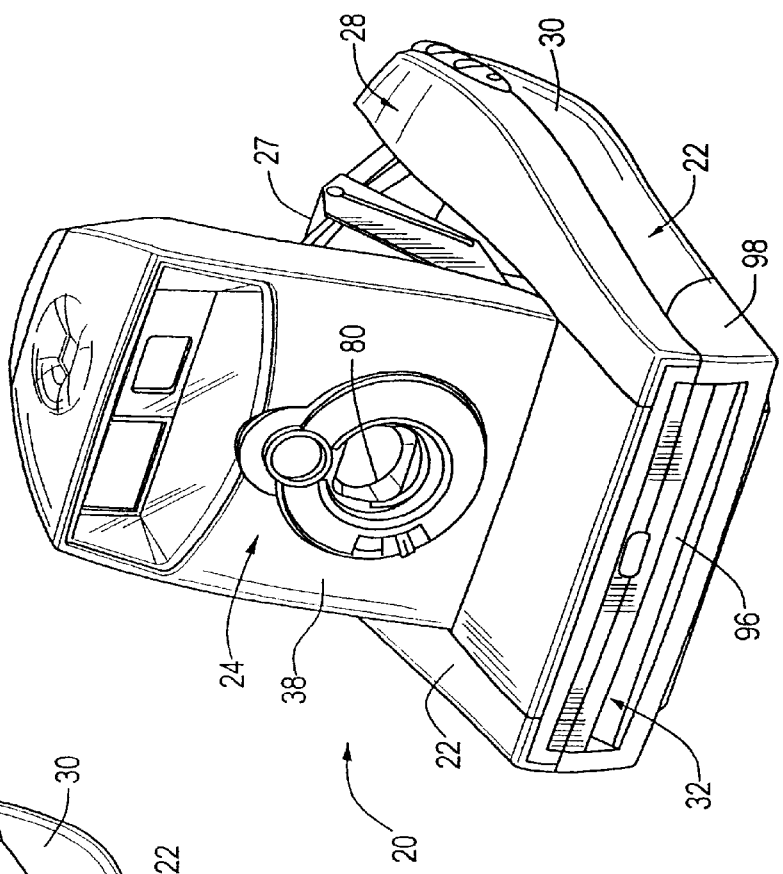
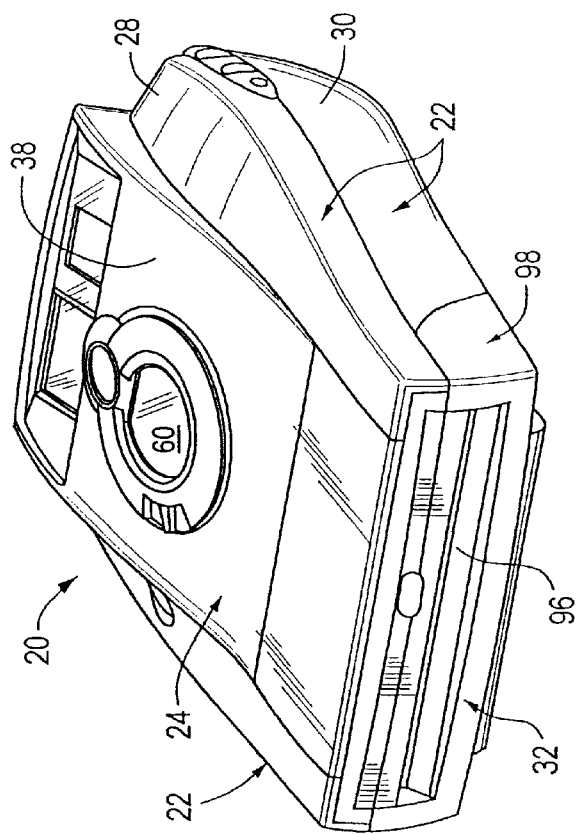

FILM ADVANCEMENT ASSEMBLY FOR A SELF-DEVELOPING CAMERA

BACKGROUND OF THE INVENTION

1. Field of the Invention

The invention relates to photographic cameras, and is directed more particularly to a film advancement assembly for a self-developing camera.

2. Description of the Prior Art

Self-developing cameras, that is, cameras for use in conjunction with self-developing film units, are well known. Such cameras receive a film cassette having a plurality of thin, flexible film units arranged in stacked relation therein. The film cassette has an exit in one end wall through which a film unit is moved after exposure, and an opening located near an opposite end of the cassette. Such cameras further include film-advancing apparatus including a pick, which is adapted to enter the opening in the cassette and engage a film unit at an end thereof most distant from the exit and move the engaged film unit through the exit. Upon emerging from the exit, the advancing film unit is engaged by a pair of opposed rolls which receive the film unit and continue the advancement thereof toward the exterior of the camera, while spreading a processing liquid upon elements the film unit to initiate formation of a visible image. In U.S. Pat. No. 3,753,392, issued Aug. 21, 1973, in the name of Edwin H. Land, there is disclosed such a camera.

The engagement of a film unit with the rolls causes the film unit to release a processing composition carried by the film unit and distributes the processing composition on the film unit. A motor mounted on the camera is connected by a gear train to at least one of the pressure-applying rolls, imparting rotary motion thereto, to advance the film between the rolls to provide the film unit with complete coverage of the processing composition during a processing cycle. In U.S. Pat. No. 3,943,786, issued Mar. 16, 1976, in the name of Loring K. Mills, there is shown and described one illustrative gear train and roll assembly.

It is further known to include in the gear train a sequencing gear, or timing gear, which initiates, controls or performs a number of operations in a camera cycle of operations, including operation of the aforementioned pick device for engaging a film unit and advancing the engaged film unit from the film cassette and into engagement with the rolls. In U.S. Pat. No. 4,047,192, issued Sep. 6, 1977, in the names of Bruce K. Johnson et al, there is disclosed such a sequencing gear and a pick governed thereby.

The aforementioned gear train is generally powered by a motor mounted on the camera and operative to power a drive gear, which initiates the operation of the gear train and all the functions governed thereby, including the pick and roll operation, that is, the film advancement operation. The motor is mounted on the frame of the camera, typically behind and above the upper of the two rolls. See U.S. Pat. No. 4,855,769, issued Aug. 8, 1989, in the names of Frederick Slavitter et al.

Folding cameras are well known. Such cameras conventionally include a main frame assembly and a lens assembly pivotally connected to the main frame assembly. The lens assembly is movable between a closed position in which the lens assembly is wholly or partly disposed in the main frame assembly, and an open position in which the lens assembly upstands from the main frame assembly. The lens assembly supports camera lens and shutter mechanisms and includes a bellows, or the like, forming an exposure chamber. The camera must be in the open position for use, and typically is closed when not in use. An illustrative example of such a camera may be seen in U.S. Pat. No. 4,755,839 issued Jul. 5, 1988, in the name of John F. Pasieka.

One object of a folding camera is to present a low profile when not in use. When the lens assembly is folded into the main frame assembly, it is desirable that the closed camera be small and streamlined, preferably suitable for disposal in a clothing pocket, or the like. Accordingly, the space previously devoted to the motor and motor mounting, which has added to the height of the camera, has become problematic.

Accordingly, there is a need for a motor mounting which does not add to the height requirement for a folding camera, but which nevertheless is suitable for driving the gear train which advances the film, and controls other camera functions.

SUMMARY OF THE INVENTION

An object of the invention is, therefore, to provide a film advancement assembly, including a motor, for a self-developing camera, particularly of the folding type, which assembly permits reduction of the height, or bottom to top dimension, of the camera.

With the above and other objects in view, as will hereinafter appear, a feature of the present invention is the provision of a film advancement assembly for a self-developing and folding camera, the camera including a main frame assembly and a lens assembly, the lens assembly being pivotally mounted on the main frame assembly and movable between a closed position in which the lens assembly is disposed at least in part within the main frame assembly, and an open position in which the lens assembly upstands from the main frame assembly. The film advancement assembly comprises a film pick mounted in the main frame assembly and adapted to engage a film unit and advance the film unit from an exposure position. A pair of spread rolls is disposed in the main frame assembly a adjacent each other and proximate a film exit slot in the main frame assembly. A gear train is mounted on the main frame assembly and is operative to drive the spread rolls, and to drive the film pick to advance the film unit. A motor is mounted on the main frame assembly and is operative to power the gear train, the motor being disposed proximate a bottom surface of the main frame assembly.

The above a and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

FIG. 1 is a perspective view of one form of folding camera of a type in which the invention finds utility, the camera being shown in the closed position;

FIG. 2 is similar to FIG. 1, but shows the camera of FIG. 1 in the open position;

DESCRIPTION OF THE PREFERRED EMBODIMENT

Referring to FIGS. 1 and 2, it will be seen that a camera 20, of the type in which the invention herein finds utility, includes a main frame assembly 22 and a lens assembly 24. The lens assembly 24 is pivotally mounted on the main frame assembly 22 and is movable between a closed position (FIG. 1) in which the lens assembly 24 is at least partially disposed in the main frame assembly 22, and an open position (FIG. 2) in which the lens assembly 24 upstands from the main frame assembly 22.

Figure 3:
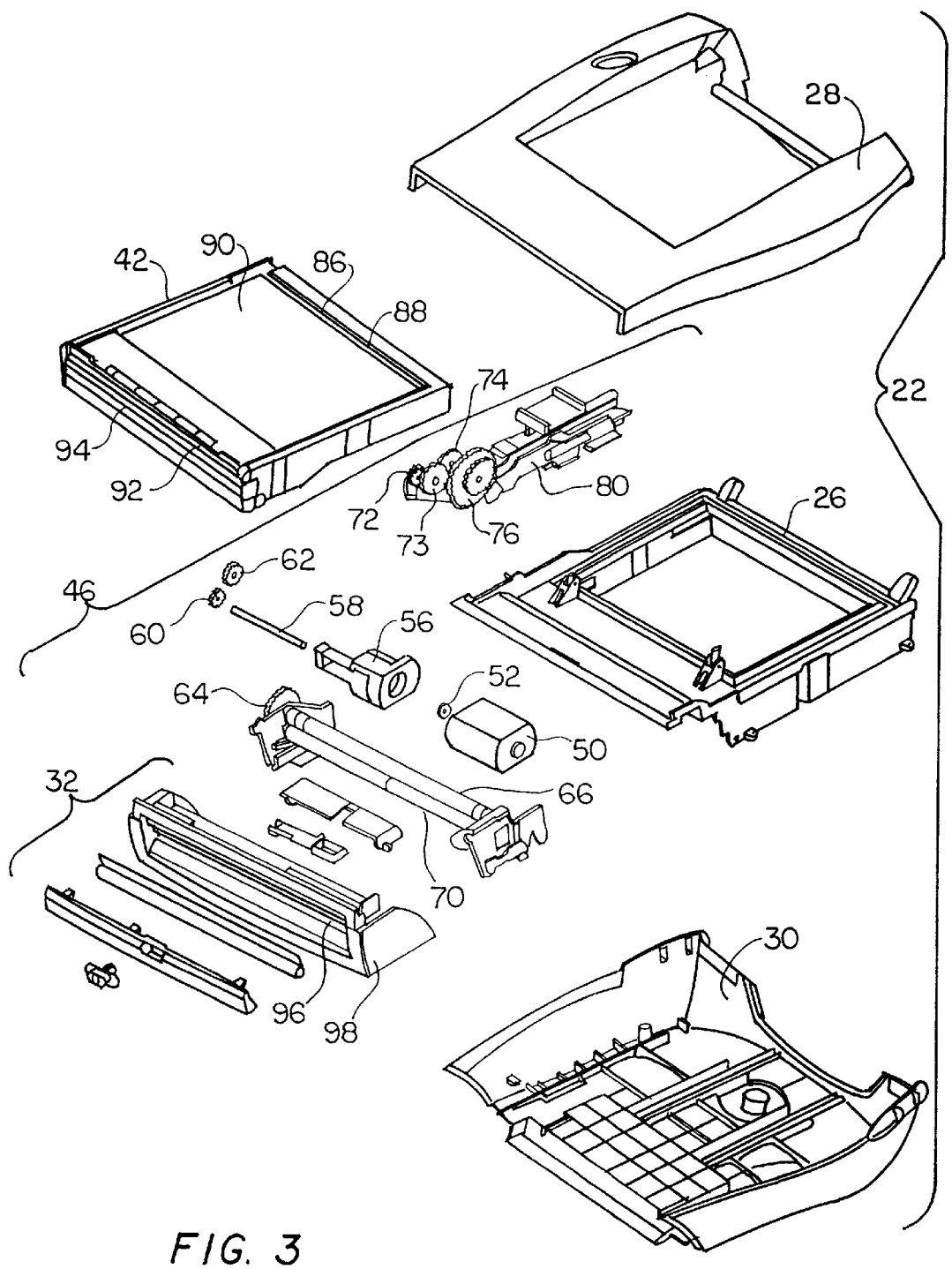
FIG. 3 is an exploded view of a portion of the camera of FIGS. 1 and 2, including components of a preferred embodiment of the invention.

Referring to FIG. 3, it will be seen that the main frame assembly 22 includes a main frame member 26 and top and bottom covers 28, 30, which house the main frame member 26. A door assembly 32, described in detail herein below, comprises a portion of the main frame assembly 22 and is pivotally connected to the main frame member 26.

Figure 4:
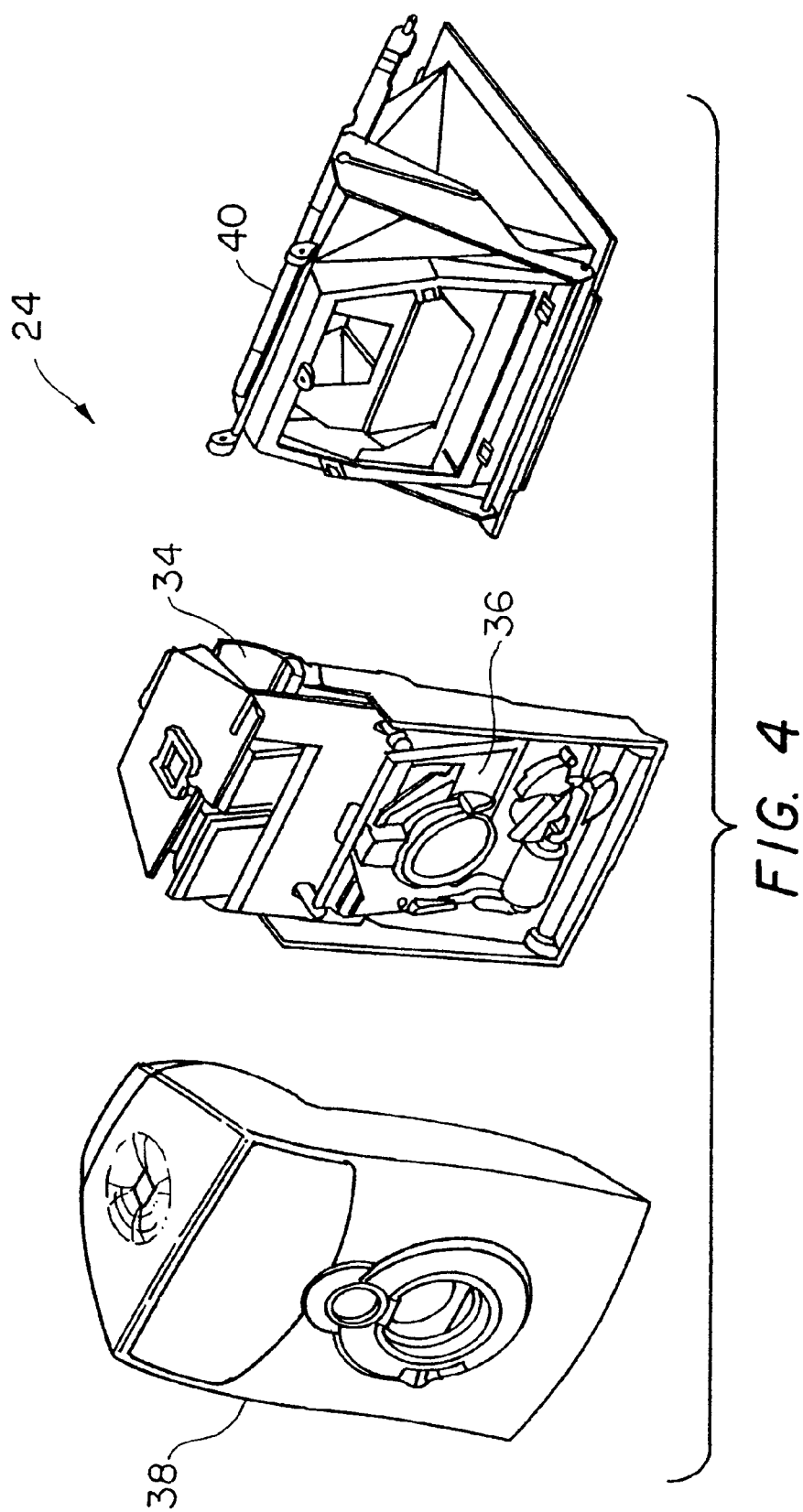
FIG. 4 is an exploded view of a further portion of the camera of FIGS. 1 and 2.
Figure 5:
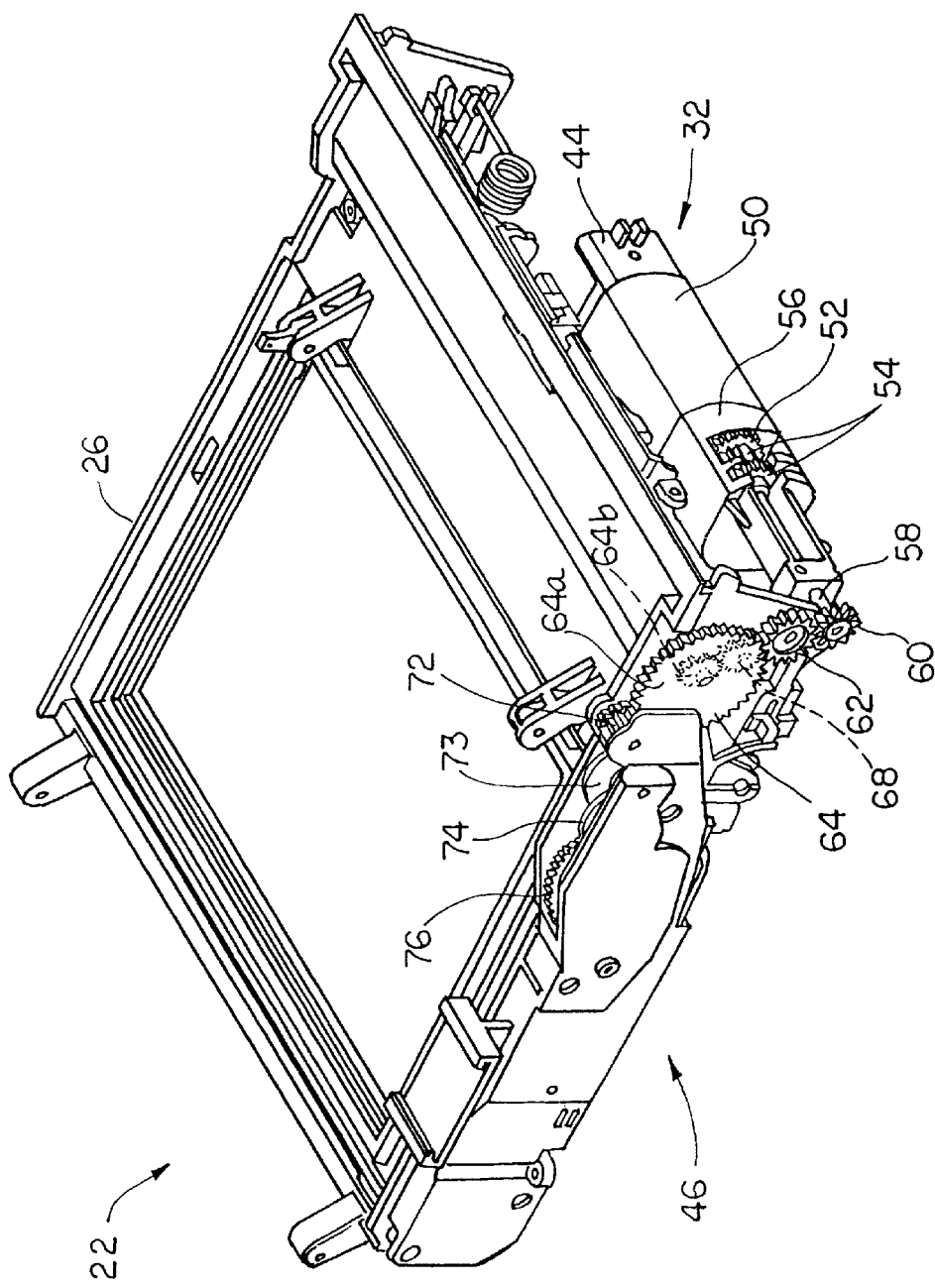
FIG. 5 is a perspective view of a main frame assembly portion of the camera of FIG. 3 and showing a preferred embodiment of the invention.
Figure 6:
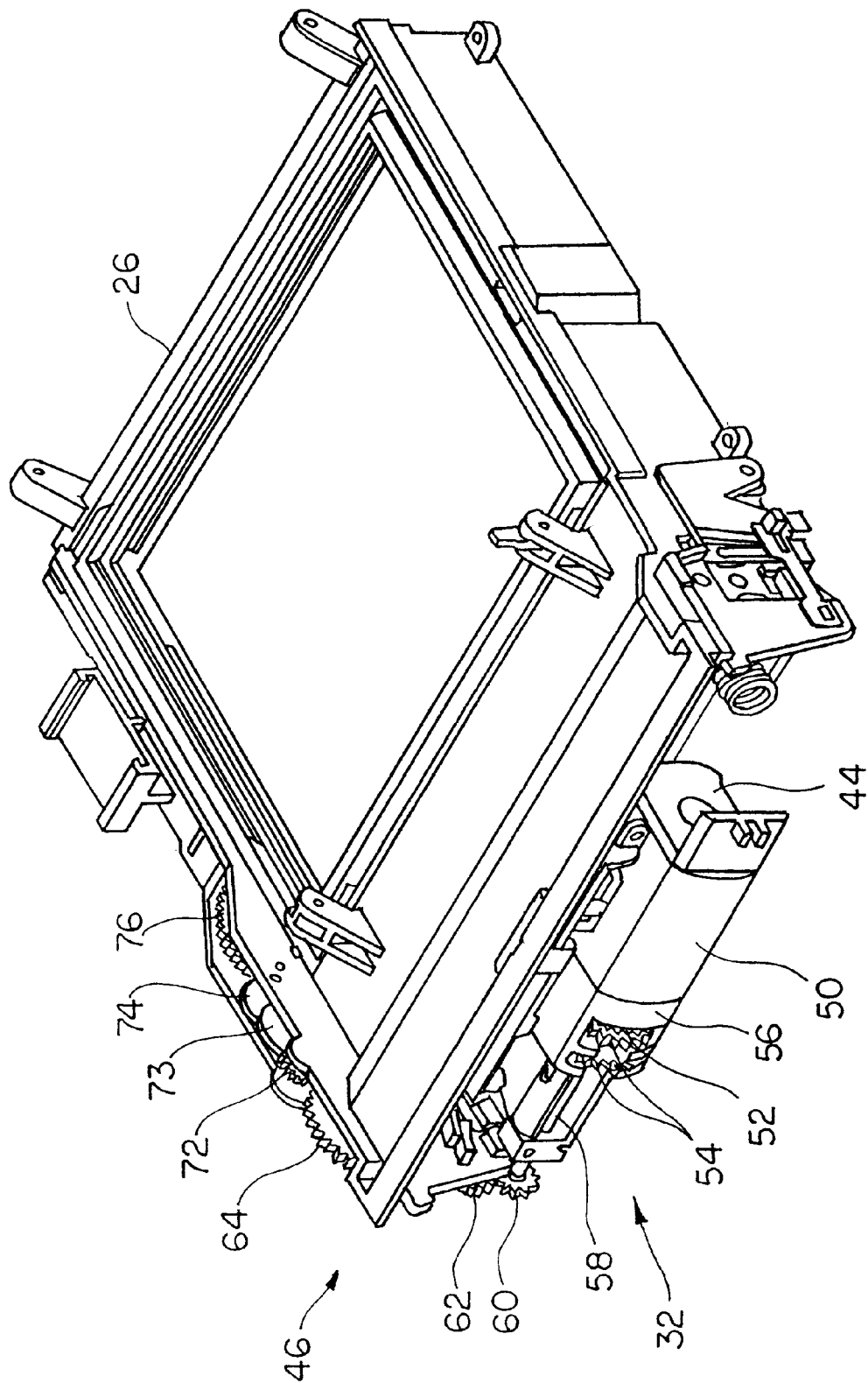
FIG. 6 is a further perspective view of the main frame assembly portion of FIG. 5.

In FIG. 4, there are shown the major components of the lens assembly 24. A base link 34 is pivotally connected to the main frame member 26 and has mounted thereon a lens and shutter assembly 36. A front cover 38 is fixed to the base link 34. Connected to the base link 34 and to the main frame member 26 is a bellows 40, or similar structure, defining an exposure chamber in which an uppermost film unit in a film cassette 42 (FIG. 3) is exposed by operation of the lens and shutter assembly 36, in known fashion.

Referring to FIGS. 3, 5, 6 and 8, it will be seen that a film advancement assembly 46 includes the door assembly 32 which, in turn, includes a motor 50 mounted on a bracket 44 fixed to the door assembly 32. The motor 50 drives a motor gear 52 which drives a series of reduction gears 54 disposed in a gear housing 56. The reduction gear 54 most removed from the motor 50 drives a gear shaft 58, on the free end of which is mounted a drive gear 60. The drive gear 60 is engaged with an idler gear 62 which is engaged with an output gear 64.

Figure 7:
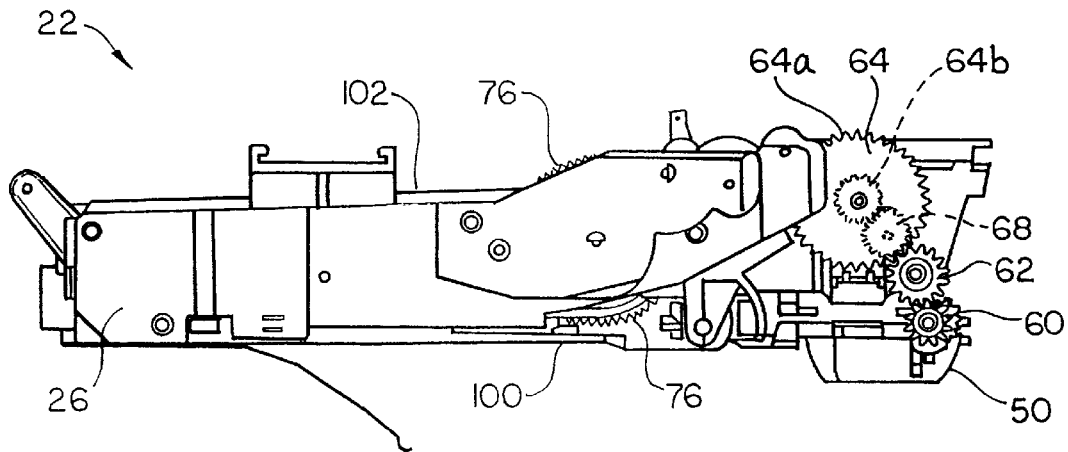
FIG. 7 is a side elevational view of the main frame assembly portion of FIGS. 5 and 6.
Figure 8:
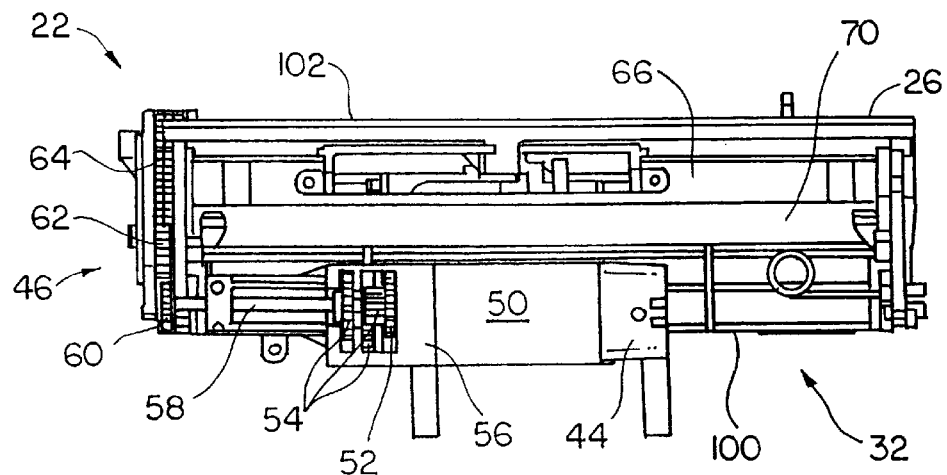
FIG. 8 is a front elevational view of the main frame assembly portion of the camera.
Figure 9:
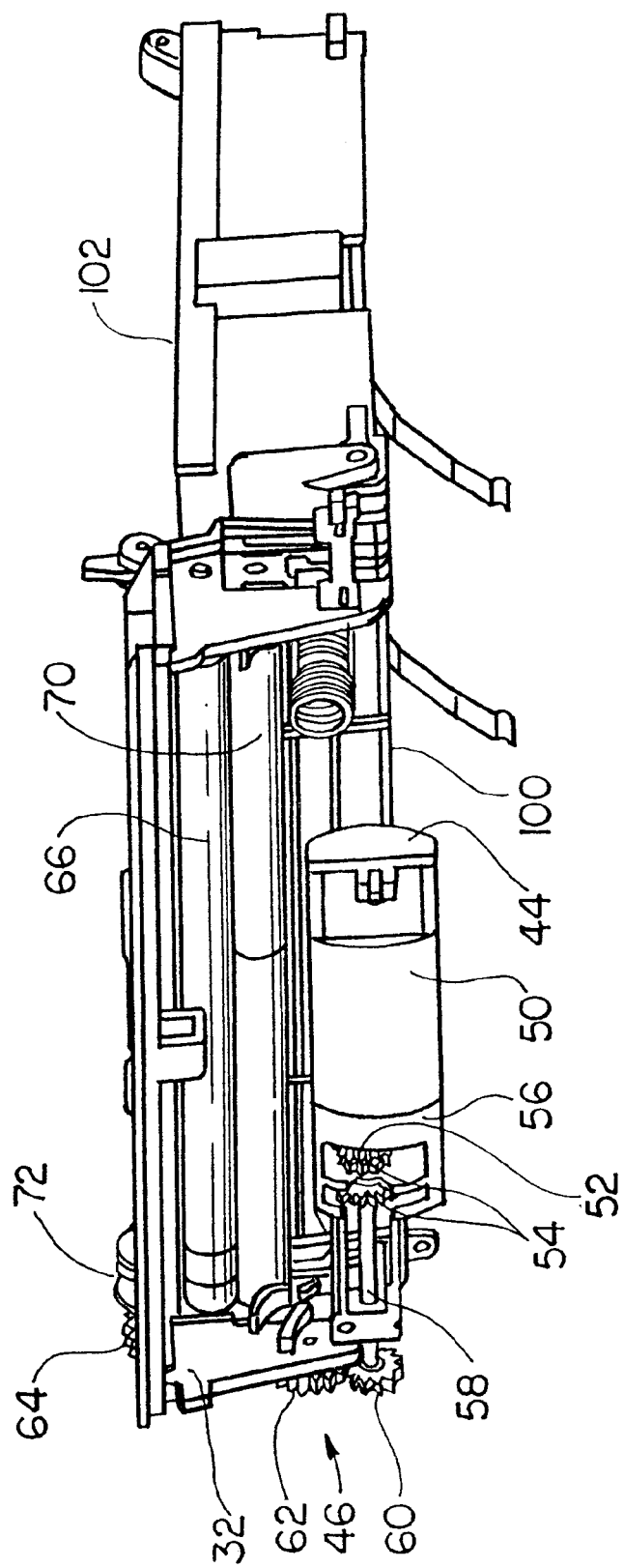
FIG. 9 is a further perspective view of the main frame assembly portion of the camera.

The output gear 64 is a compound gear (FIGS. 5 and 7), having a first gear portion 64a which is engaged with the idler gear 62 (FIG. 5) and which directly drives an upper roll 66 (FIGS. 8 and 9). The compound gear 64 is further provided with a second gear portion 64b (FIGS. 5 and 7) which is engaged with a bottom gear 68 which directly drives a lower roll 70 (FIGS. 8 and 9). Thus, the output gear 64 drives both the upper and lower rolls 66, 70 simultaneously. The output gear first portion 64a further drives reduction gears 72, 73 and 74 (FIGS. 5, 6, 10 and 11), the last of which drives a timing gear 76 (FIG. 10).

Figure 10:
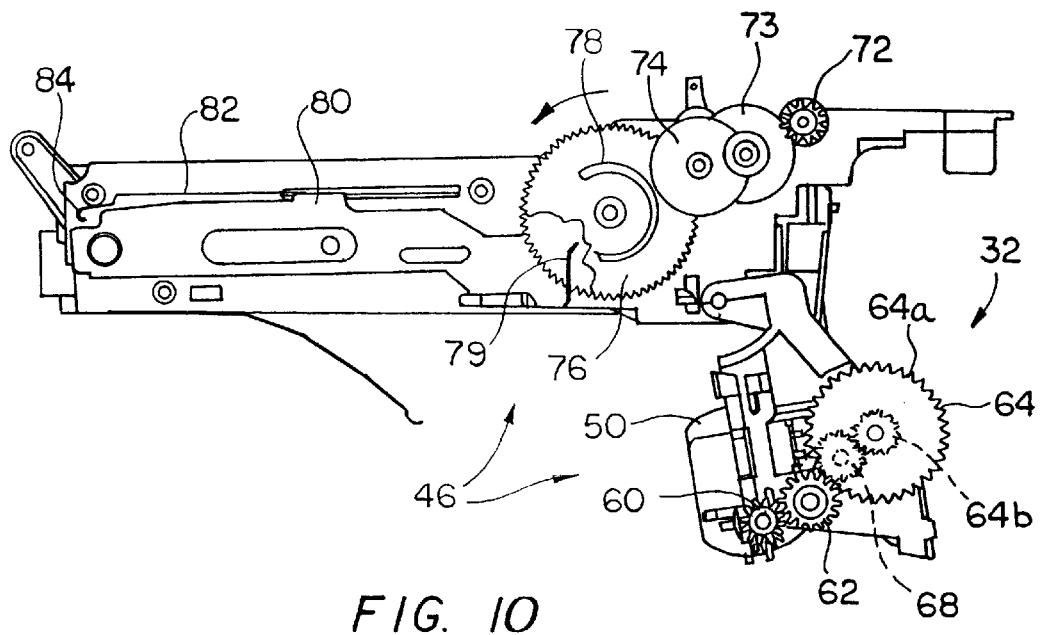
FIG. 10 is a side elevational view of the main frame assembly portion with cover structures removed to reveal inner features, and with portions of the inventive assembly moved to an alternative position to facilitate entry of a film cassette.
Figure 11:
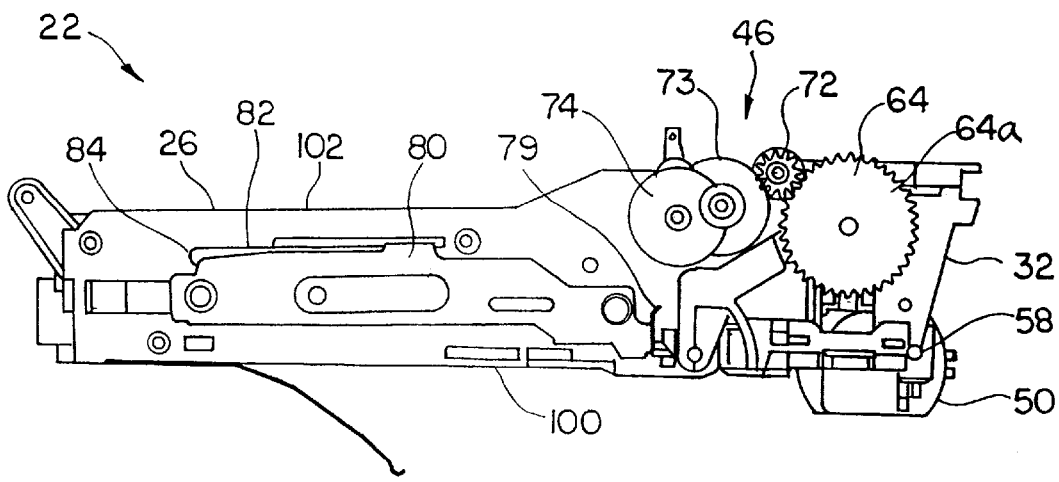
FIG. 11 is similar to FIG. 10 but with a timing gear removed to better illustrate inner features.

As shown in FIG. 10, the timing gear 76 is provided with an arcuate cam 78 thereon. The timing gear 76 rotates one time during a cycle of operation of the camera and sequences a number of the camera's operations. The timing gear rotates counter-clockwise, as viewed in FIG. 10. After the top-most film unit has been exposed, the cam 78 engages a lug 79 upstanding from a pick member 80 which includes a pick arm 82 having a hooked free end 84. The cam 78 carries the pick member 80 forwardly from the position shown in FIG. 10 to the position shown in FIG. 11. The hooked free end 84 of the pick arm 82 enters the film cassette 42 through an opening 86 (FIG. 3), engages a rearward edge 88 of the top film unit 90, and pushes the film unit out a slot 92 in a forward wall 94 of the film cassette 42.

Upon emergence from the film cassette 42, the film unit 90 engages the rolls 66, 70 which are rotating and which press the film unit therebetween, to rupture a repository (not shown) of processing fluid and spreading the fluid on the film unit, as is known in the art. The film unit continues through an exit slot 96 in a film door 98 (FIGS. 1–3) to pass out of the camera.

As shown in FIGS. 7-9 and 11, the motor 50 is mounted on the main frame assembly 22 proximate a bottom surface 100 of the main frame member 26. As illustrated, the motor 50 extends downwardly beyond the surface 100 and is spaced from an upper surface 102 of the main frame member. Thus, the motor 50, and attendant components of the film advancement assembly, are disposed in the camera in a manner not contributing to the height of the camera or in any way requiring height for its accommodation. The camera may accordingly be of smaller size, particularly in the closed condition when pocketing of the camera is a desirable convenience.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A film advancement assembly for a self-developing and folding camera, the camera comprising a main frame assembly and a lens assembly, the lens assembly being pivotally mounted on the main frame assembly and movable between a closed position in which the lens assembly is disposed at least in part within the main frame assembly and an open position in which the lens assembly upstands from the main frame assembly, the lens assembly having lens and shutter means therein, said film advancement assembly comprising:

a film pick mounted in the main frame assembly and adapted to engage a film unit and advance the film unit from an exposure position;

a pair of spread rolls mounted in the main frame assembly adjacent each other and proximate a film exit slot in the main frame assembly; a gear train mounted on the main frame assembly and operative to drive said pair of spread rolls, and operative to drive said film pick for advancement of the film unit; and a motor mounted on the main frame assembly for driving said gear train, and thereby said pick and said spread rolls for the advancement of the film unit, said motor being fixed to the main frame assembly and proximate a bottom surface of the main frame assembly.

2. The film advancement assembly in accordance with claim 1 wherein said film pick comprises a movable pick member having a pick arm thereon, the pick arm having at a free end thereof a hook for engaging an edge of the film unit for advancing the film unit.

3. The film advancement assembly in accordance with claim 1 wherein said gear train includes an output gear operative to drive said spread rolls, and further includes a timing gear operative to drive said film pick.

4. The film advancement assembly in accordance with claim 1 and further comprising a door assembly portion of said main frame assembly, said spread rolls being mounted in said door assembly portion and the exit slot being disposed in said door assembly portion, said spread rolls being proximate the exit slot.

5. The film advancement assembly in accordance with claim 4 wherein said motor is mounted on said door assembly portion.

6. The film advancement assembly in accordance with claim 5 wherein said door assembly portion is pivotally connected to a main frame member of the main frame assembly.

7. The film advancement assembly in accordance with claim 6 wherein said gear train is mounted in part on the main frame member and in part on said door assembly portion.

8. The film advancement assembly in accordance with claim 1 wherein said motor extends beneath the bottom surface of the main frame assembly.

9. The film advancement assembly in accordance with claim 1 wherein said motor is spaced from an upper surface of a main frame member of the main frame assembly.

10. A film advancement assembly for a self-developing camera having a main frame assembly, the film advancement assembly comprising: a door assembly fixed to a main frame member portion of the main frame assembly and including a front wall having an exit slot therein for passage of a film unit therethrough from an interior of the camera to an exterior of the camera;
   a film pick mounted in the main frame member portion and adapted to engage a film unit and advance the film unit from an exposure position toward said door assembly portion;
   a pair of spread rolls disposed in the door assembly portion adjacent each other and proximate the exit slot;
   a gear train mounted on the main frame assembly and including an output gear operative to drive said spread rolls, and a timing gear operative to drive said film pick and to sequence other operations of the camera to effect exposure of a film unit and to advance the film unit toward said door assembly portion; and
   a motor mounted on said door assembly portion and operative to power said gear train, said motor being mounted on said door assembly portion proximate the front wall and the exit slot.

11. The film advancement assembly in accordance with claim 10, wherein said gear train includes a drive gear, and an output gear in communication with the drive gear, and the output gear is a compound gear comprising a first gear driven by the drive gear and a second gear concentrically inwardly of the first gear and engaged with a bottom gear, the first gear driving an upper of said spread rolls and the bottom gear driving a lower of said spread rolls.

12. The film advancement assembly in accordance with claim 10 wherein said motor is disposed on the main frame assembly proximate a bottom surface thereof and spaced from an upper surface thereof.

13. The film advancement assembly in accordance with claim 12 wherein said motor extends downwardly beyond the bottom surface of the main frame assembly.

14. A film advancement assembly for a self-developing camera having a main frame assembly, the film advancement assembly comprising:
   a door assembly fixed to a main frame member portion of the main frame assembly and including a front wall having an exit slot therein for passage of a film unit therethrough from an interior of the camera to an exterior of the camera;
   a film pick mounted in the main frame member portion and adapted to engage a film unit and advance the film unit from an exposure position toward said door assembly;
   a pair of spread rolls disposed in the door assembly adjacent each other and proximate the exit slot;
   a gear train mounted on said main frame member portion and said door assembly and including a drive gear, an output gear in communication with the drive gear and operative to drive said spread rolls, and a timing gear in communication with the output gear and operative to drive said film pick and to sequence other operations of the camera to effect exposure of a film unit and to advance the film unit from an exposure position toward said door assembly; and
   a motor mounted on said door assembly and operative to power the drive gear, said motor being mounted in said door assembly proximate the front wall and the exit slot.

15. The film advancement assembly in accordance with claim 14, wherein the output gear is a compound gear comprising a first gear driven by the drive gear and a gear concentrically inwardly of the first gear and engaged with a bottom gear, the first gear driving an upper of said spread rolls and the bottom gear driving a lower of said spread rolls.

16. The film advancement assembly in accordance with claim 14 wherein said motor is disposed proximate a bottom surface of the main frame member.

17. The film advancement assembly in accordance with claim 16 wherein said motor is spaced from an upper surface of the main frame member.

18. The film advancement assembly in accordance with claim 16 wherein said motor extends downwardly beyond the bottom surface of the main frame member.

* * * * *